(12) United States Patent
Bryan et al.

(10) Patent No.: US 11,524,674 B2
(45) Date of Patent: Dec. 13, 2022

(54) ELECTRIFIED VEHICLE ON-BOARD GENERATOR POWER LIMIT ARBITRATION

(71) Applicant: Ford Global Technologies, LLC, Dearborn, MI (US)

(72) Inventors: Seth Anthony Bryan, Royal Oak, MI (US); Adam J. Richards, Royal Oak, MI (US); Scott Steadmon Thompson, Belleville, MI (US); Nicholas Herhusky, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 240 days.

(21) Appl. No.: 17/030,255

(22) Filed: Sep. 23, 2020

(65) Prior Publication Data
US 2022/0089143 A1  Mar. 24, 2022

(51) Int. Cl.
| | | |
|---|---|---|
| *B60L 1/00* | (2006.01) | |
| *B60L 58/12* | (2019.01) | |
| *B60W 20/13* | (2016.01) | |
| *B60K 6/28* | (2007.10) | |
| *B60K 6/26* | (2007.10) | |

(Continued)

(52) U.S. Cl.
CPC ............... *B60W 20/13* (2016.01); *B60K 6/24* (2013.01); *B60K 6/26* (2013.01); *B60K 6/28* (2013.01); *B60L 1/006* (2013.01); *B60L 58/12* (2019.02); *B60W 10/06* (2013.01); *B60W 10/08* (2013.01); *B60W 10/30* (2013.01);

(Continued)

(58) Field of Classification Search
CPC ...... B60W 20/13; B60W 10/06; B60W 10/08; B60W 10/30; B60L 58/12; B60L 1/006; B60K 6/24; B60K 6/26; B60K 6/28; B60Y 2200/91; B60Y 2200/92; B60Y 2300/43; B60Y 2300/60
See application file for complete search history.

(56) References Cited

U.S. PATENT DOCUMENTS

| | | |
|---|---|---|
| 2010/0225258 A1 | 9/2010 | Namuduri et al. |
| 2020/0055473 A1* | 2/2020 | Ferrel .................. H02J 1/10 |

(Continued)

FOREIGN PATENT DOCUMENTS

JP        2009126456 A  *  6/2009  ............ B60W 10/08

*Primary Examiner* — Tisha D Lewis
(74) *Attorney, Agent, or Firm* — Brooks Kushman PC; David Kelley

(57) ABSTRACT

An electrified vehicle may include an engine, an electric machine selectively coupled to the engine, a high-voltage traction battery electrically coupled to the electric machine and configured to selectively propel the electrified vehicle, an on-board generator including an inverter electrically coupled to the high-voltage traction battery and configured to convert direct current input to alternating current output, power outlets configured to receive power from the inverter of the on-board generator, a user interface, and a controller programmed to control the engine, the electric machine, and the high-voltage traction battery to provide power to on-board generator and to control the inverter to limit the power output by the inverter to the power outlets to one of a user-specified power limit based on input from the user interface, a powertrain power limit associated with the engine, the electric machine, and the high-voltage traction battery, and an inverter hardware power limit.

18 Claims, 5 Drawing Sheets

(51) Int. Cl.
    *B60K 6/24*           (2007.10)
    *B60W 10/06*        (2006.01)
    *B60W 10/30*        (2006.01)
    *B60W 10/08*        (2006.01)

(52) U.S. Cl.
    CPC ....... *B60Y 2200/91* (2013.01); *B60Y 2200/92* (2013.01); *B60Y 2300/43* (2013.01); *B60Y 2300/60* (2013.01)

(56) References Cited

U.S. PATENT DOCUMENTS

| | | | |
|---|---|---|---|
| 2020/0108819 A1* | 4/2020 | Revach | B60W 20/13 |
| 2020/0112163 A1* | 4/2020 | Revach | H01H 71/70 |
| 2021/0387528 A1* | 12/2021 | Thompson | B60K 15/03 |

\* cited by examiner

ELECTRIFIED VEHICLE ON-BOARD GENERATOR POWER LIMIT ARBITRATION

TECHNICAL FIELD

This application generally relates to a system for operating an electrified vehicle power system for supplying power from an on-board generator to external devices.

BACKGROUND

Vehicles may be configured to provide a limited amount of power to various pluggable accessories. For example, vehicles may provide one or more USB ports with 5 VDC power, one or more circular auxiliary power ports with 12 VDC power, and/or one or more 120 VAC outlets for providing power to external (non-integrated or off-board) devices (i.e. devices supplied by the user and removably connected and powered by the vehicle, whether internal or external to the vehicle cabin). Aggregate power capability of these outlets has been generally relatively low, on the order of 400 W, for example, largely due to the power availability of a low-voltage auxiliary battery (12 VDC-48 VDC, for example) and engine-powered generator/alternator. Electrified vehicles, such as electric and hybrid vehicles present additional opportunities for providing power to various types of external devices. Electrified vehicles provide increased power storage and generation capabilities such that it is possible to provide higher levels of power to external devices. As more power can be provided to off-board devices, balancing internal/on-board (integrated) and external/off-board power requirements becomes more complex.

SUMMARY

Embodiments according to the disclosure include an electrified vehicle comprising an electric machine coupled to a high-voltage traction battery configured to selectively propel the electrified vehicle, an inverter electrically coupled to the high-voltage traction battery and configured to convert direct current input to alternating current output, power outlets configured to receive power from the inverter, and a controller programmed to limit power provided by the inverter to the power outlets to one of a user-specified power limit, a powertrain power limit associated with the electric machine and the high-voltage traction battery, and an inverter hardware power limit. The controller may be programmed to limit power provided by the inverter to the power outlets to a lowest one of the user-specified power limit, the powertrain power limit, and the inverter hardware power limit. The electrified vehicle may include an engine coupled to the electric machine, wherein the powertrain power limit is further associated with the engine. The electrified vehicle may limit the power provided by the inverter based on a powertrain power limit, which is responsive to current engine output power, current vehicle speed, current driver demand, and current electric machine output power. The electrified vehicle may include a user interface configured to receive input from a user to select the user-specified power limit from a plurality of available user-specified power limits. The electrified vehicle may include a user interface, wherein the controller is further programmed to communicate a currently active power limit to the user interface. The user interface may be configured to receive a user-specified power limit. The powertrain power limit and the inverter hardware power limit may include associated estimated losses of the powertrain and inverter hardware, respectively.

Embodiments also include a method for controlling an electrified vehicle having an electric machine coupled to a high-voltage traction battery configured to selectively propel the vehicle and an inverter electrically coupled to the high-voltage traction battery and configured to convert direct current input to alternating current output connected to a plurality of vehicle outlets. The method may include controlling the inverter to limit power to the plurality of vehicle outlets to a lowest one of a plurality of power limits including at least a user-selected power limit, a powertrain power limit associated with electric machine power output, and an inverter hardware power limit; and communicating the lowest one of the power limits to a user interface. The method may also include receiving the user-selected power limit via the user interface. Various embodiments include a method where the vehicle includes an engine selectively coupled to the electric machine and the powertrain power limit is based on current engine output power, maximum engine output power, current electric machine output power, maximum electric machine output power, and driver demand. The powertrain power limit may be further based on vehicle speed. The method may also include a powertrain limit based on a state-of-charge of the high-voltage traction battery. The method may also include terminating power to at least one of the plurality of power limits to control the inverter to limit power to the lowest one of the plurality of power limits. The method may also include communicating the terminating of power to the user interface.

One or more embodiments include an electrified vehicle having an engine, an electric machine selectively coupled to the engine, a high-voltage traction battery electrically coupled to the electric machine and configured to selectively propel the electrified vehicle, an on-board generator including an inverter electrically coupled to the high-voltage traction battery and configured to convert direct current input to alternating current output, power outlets configured to receive power from the inverter of the on-board generator, a user interface, and a controller programmed to control the engine, the electric machine, and the high-voltage traction battery to provide power to on-board generator and to control the inverter to limit the power output by the inverter to the power outlets to one of a user-specified power limit based on input from the user interface, a powertrain power limit associated with the engine, the electric machine, and the high-voltage traction battery, and an inverter hardware power limit. The electrified vehicle may include a controller programmed to limit the power output by the inverter to the lowest of the user-specified power limit, the powertrain power limit, and the inverter hardware power limit. The electrified vehicle may include a controller programmed to communicate which power limit is currently limiting the power output by the inverter to the user interface. The electrified vehicle may include a controller programmed to terminate power to at least one of the power outlets to limit the power output by the inverter. The electrified vehicle may include a powertrain power limit based on current engine output power, current electric machine output power, state of charge of the high-voltage traction battery, and vehicle speed.

Embodiments according to the present disclosure may provide associated advantages. For example, one or more embodiments provide an electrified vehicle with an on-board generator capable of providing 120/240 VAC with high power output capacity between 2.0-7.2 kW, for example.

Sine wave AC power generation is integrated with the vehicle using existing vehicle powertrain and cooling systems. Power generation capability is provided while the vehicle is on-road or stationary to various outlets throughout the vehicle to provide power for customer-provided or external devices. Power may be sourced from a high-voltage traction battery in battery electric vehicles (BEVs) as well as from the electric machine driven by the engine in hybrid vehicles. To facilitate high capacity power delivery, one or more controllers provide a system and method for arbitration and aggregation of power limits from multiple vehicle subsystems as well as a user selected power limit provided via a user interface. The user interface provides feedback to the user with respect to active power limits and sources as well as any load shedding or power reduction or termination to one or more outlets or subsystems.

The above advantages and other advantages and features of the present disclosure will be apparent from the following detailed description of the preferred embodiments when taken in connection with the accompanying drawings.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the teachings of the present disclosure. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
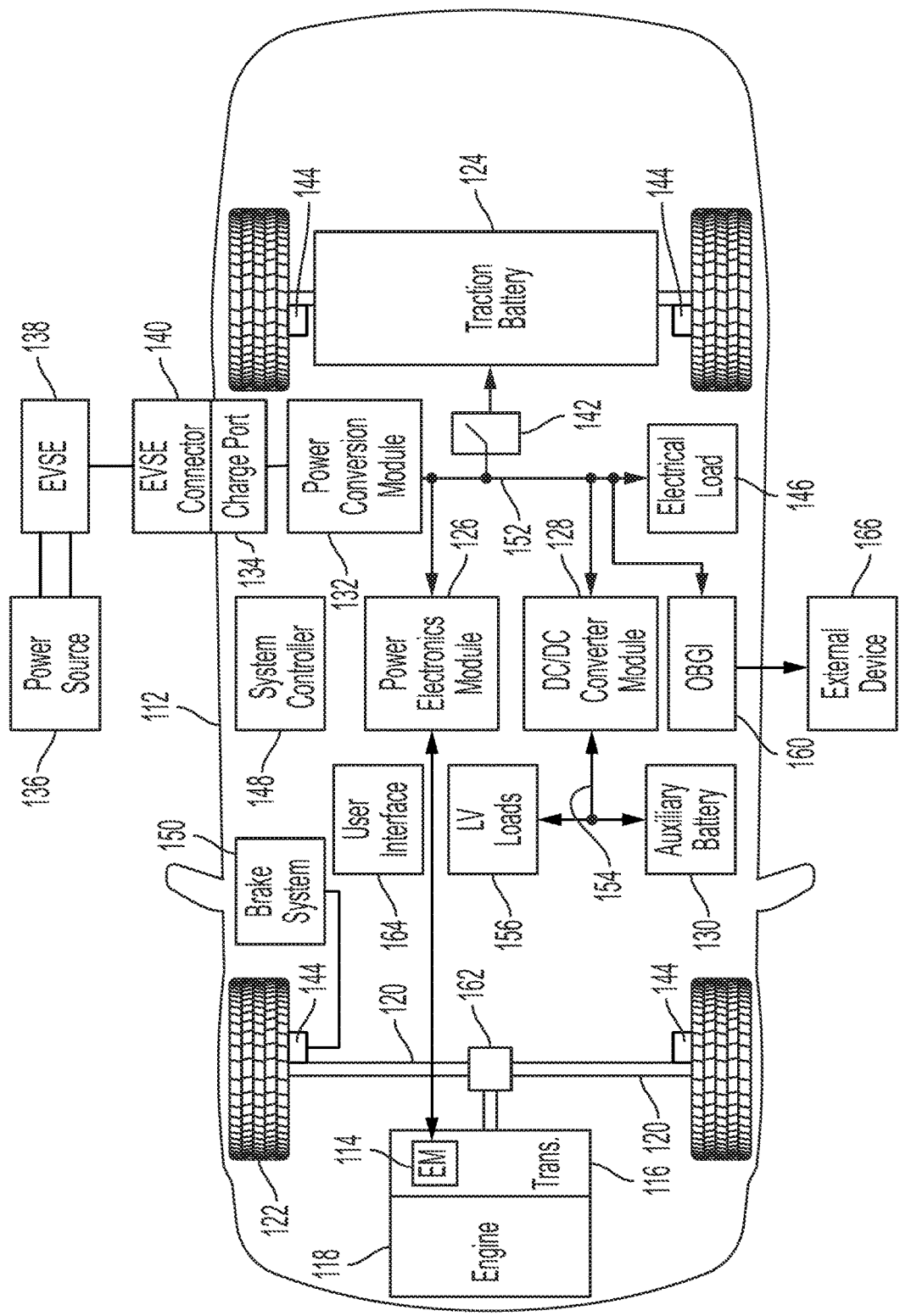
FIG. 1 is a block diagram illustrating a representative configuration of an electrified vehicle having on-board generator power limit arbitration.

FIG. 1 depicts an electrified vehicle 112 that may be referred to as a plug-in hybrid-electric vehicle (PHEV). An electrified vehicle 112 may also be a battery electric vehicle (BEV). In a BEV configuration, the engine 118 may not be present. In other configurations, the electrified vehicle 112 may be a full hybrid-electric vehicle (FHEV) without plug-in capability.

A plug-in hybrid-electric vehicle 112 may comprise one or more electric machines 114 mechanically coupled to a gearbox or hybrid transmission 116. The electric machines 114 may be capable of operating as a motor and a generator. In addition, the hybrid transmission 116 is selectively mechanically and/or hydraulically coupled to an engine 118. The hybrid transmission 116 may be mechanically coupled to a differential 162 that is configured to adjust the speed of drive shafts 120 that are mechanically coupled to drive wheels 122 of the vehicle 112. The drive shafts 120 may be referred to as the drive axle. In some configurations, a clutch may be disposed between the hybrid transmission 116 and the differential 162. The electric machines 114 can provide propulsion and deceleration capability when the engine 118 is turned on or off. The electric machines 114 may also act as generators and can provide fuel economy benefits by recovering energy stored in a high-voltage traction battery 124 that would normally be lost as heat in a friction braking system. Alternatively, or in combination, electric machines 114 may be operated as a generator when the vehicle is on-road or stationary to provide an on-board generator 160 capability as described in greater detail herein. The electric machines 114 may also reduce vehicle emissions by allowing the engine 118 to operate at more efficient speeds and allowing the electrified vehicle 112 to be operated in electric mode with the engine 118 off under certain conditions.

A high-voltage battery pack or traction battery 124 stores energy that can be used by the electric machines 114 and/or the on-board generator inverter 160 to power one or more external (customer-supplied) devices 166. The traction battery 124 may provide a high voltage direct current (DC) output. A contactor module 142 may include one or more contactors configured to isolate the traction battery 124 from a high-voltage bus 152 when opened and connect the traction battery 124 to the high-voltage bus 152 when closed. The high-voltage bus 152 may include power and return conductors for carrying current over the high-voltage bus 152. The contactor module 142 may be integrated with the traction battery 124. One or more power electronics modules 126 may be electrically coupled to the high-voltage bus 152. The power electronics modules 126 are also electrically coupled to the electric machines 114 and provide the ability to bi-directionally transfer energy between the traction battery 124 and the electric machines 114. For example, a traction battery 124 may provide a DC voltage while the electric machines 114 may operate with a three-phase alternating current (AC) to function. The power electronics module 126 may convert the DC voltage to a three-phase AC current to operate the electric machines 114, and may also provide single-phase AC current to the on-board generator inverter (OBGI) 160 in various embodiments. In a regenerative mode, the power electronics module 126 may convert the three-phase AC current from the electric machines 114 acting as generators to the DC voltage compatible with the traction battery 124.

In addition to providing energy for propulsion, the traction battery 124 may provide energy or power for other vehicle electrical systems. The vehicle 112 may include a DC/DC converter module 128 that converts the high voltage DC output from the high-voltage bus 152 to a low-voltage DC level of a low-voltage bus 154 that is compatible with low-voltage loads 156. An output of the DC/DC converter module 128 may be electrically coupled to an auxiliary battery 130 (e.g., 12V, 24V, or 48V battery) for charging the auxiliary battery 130. The low-voltage loads 156 may be electrically coupled to the auxiliary battery 130 via the low-voltage bus 154. One or more high-voltage electrical loads 146 (e.g., 100V or higher) may be coupled to the high-voltage bus 152. The high-voltage electrical loads 146 may have an associated controller that operates and controls the high-voltage electrical loads 146 when appropriate. Examples of high-voltage electrical loads 146 may be a fan, an electric heating element and/or an air-conditioning compressor.

The electrified vehicle 112 may be configured to recharge the traction battery 124 from an external power source 136. The external power source 136 may be a connection to an electrical outlet. The external power source 136 may be electrically coupled to a charge station or electric vehicle supply equipment (EVSE) 138. The external power source 136 may be an electrical power distribution network or grid as provided by an electric utility company. The EVSE 138 may provide circuitry and controls to regulate and manage the transfer of energy between the power source 136 and the electrified vehicle 112. The external power source 136 may provide DC or AC electric power to the EVSE 138. The EVSE 138 may have a charge connector 140 for coupling to a charge port 134 of the vehicle 112. The charge port 134 may be any type of port configured to transfer power from the EVSE 138 to the vehicle 112. The charge port 134 may be electrically coupled to an on-board power conversion module or charger 132. The charger 132 may condition the power supplied from the EVSE 138 to provide the proper voltage and current levels to the traction battery 124 and the high-voltage bus 152. The charger 132 may interface with the EVSE 138 to coordinate the delivery of power to the vehicle 112. The EVSE connector 140 may have pins that mate with corresponding recesses of the charge port 134. Alternatively, various components described as being electrically coupled or connected may transfer power using a wireless inductive coupling.

The electrified vehicle 112 may include one or more wheel brakes 144 provided for decelerating the vehicle 112 and preventing motion of the vehicle 112. The wheel brakes 144 may be hydraulically actuated, electrically actuated, or some combination thereof. The wheel brakes 144 may be a part of a brake system 150. The brake system 150 may include other components to operate the wheel brakes 144. For simplicity, the figure depicts a single connection between the brake system 150 and one of the wheel brakes 144. A connection between the brake system 150 and the other wheel brakes 144 is implied. The brake system 150 may include a controller to monitor and coordinate the brake system 150. The brake system 150 may monitor the brake components and control the wheel brakes 144 for vehicle deceleration. The brake system 150 may respond to driver commands and may also operate autonomously to implement features such as stability control. The controller of the brake system 150 may implement a method of applying a requested brake force when requested by another controller or sub-function.

Electronic modules in the vehicle 112 may communicate via one or more vehicle networks. The vehicle network may include a plurality of channels for communication. One channel of the vehicle network may be a serial bus such as a Controller Area Network (CAN). One of the channels of the vehicle network may include an Ethernet network defined by Institute of Electrical and Electronics Engineers (IEEE) 802 family of standards. Additional channels of the vehicle network may include discrete connections between modules and may include power signals from the auxiliary battery 130. Different signals may be transferred over different channels of the vehicle network. For example, video signals may be transferred over a high-speed channel (e.g., Ethernet) while control signals may be transferred over CAN or discrete signals. The vehicle network may include any hardware and software components that aid in transferring signals and data between modules. The vehicle network is not explicitly illustrated in FIG. 1, but it may be implied that the vehicle network may connect to any electronic module that is present in the vehicle 112, including a human-machine interface (HMI) that includes a user interface 164 configured to receive user input and to display information related to vehicle features, settings, operating conditions, and ambient conditions, for example. User interface 164 may include a touch screen or similar device and/or physical buttons, switches, sliders, lights, indicators, etc. A vehicle system controller (VSC) 148 may be present to coordinate the operation of the various components. Note that operations and procedures that are described herein may be implemented within or across one or more controllers. Implementation of features that may be described as being implemented by a particular controller is not necessarily limited to implementation by that particular controller and may be implemented in whole or in part by one or more other controllers programmed to perform one or more functions or operations. Functions may be distributed among multiple controllers communicating via the vehicle network.

The vehicle 112 may be configured to provide electrical power for external devices 166. As used herein, external devices 166 include non-integrated devices that are generally supplied by the user/customer and may located inside or outside of the vehicle cabin, bed, or body. The vehicle 112 may further include an On-Board Generator Inverter (OBGI) system 160. The OBGI system 160 is an integral vehicle system that is configured to provide electrical power to one or more external devices 166. The OBGI system 160 may receive power from the high-voltage bus 152 and the traction battery 124. The OBGI system 160 may include power conversion circuitry to generate a single phase AC output voltage and AC current for external devices that may be temporarily or removably connected to the OBGI system 160 via a plug connector, such as 110 VAC or 220 VAC, for example.

In various embodiments, an electrified vehicle 112 includes an engine 118, an electric machine 114 selectively coupled to the engine 118, a high-voltage traction battery 124 electrically coupled to the electric machine 114 and configured to selectively propel the electrified vehicle 112, an on-board generator including an inverter 160 electrically coupled to the high-voltage traction battery 124 and configured to convert direct current input to alternating current output. Electrified vehicle 112 may include power outlets at various locations throughout the vehicle interior and/or exterior configured to receive power from the inverter 160 of the on-board generator. Electrified vehicle 112 also includes a user interface 164 and one or more controllers 148 programmed to control the engine 118, the electric machine 114, and the high-voltage traction battery 124 to provide power to the on-board generator and to control the inverter 160 to limit the power output by the inverter to the power outlets to one of a user-specified power limit based on input from the user interface 164, a powertrain power limit associated with the engine 118, the electric machine 114, and the high-voltage traction battery 124, and an inverter hardware power limit associated with OBGI 160.

Figure 2:
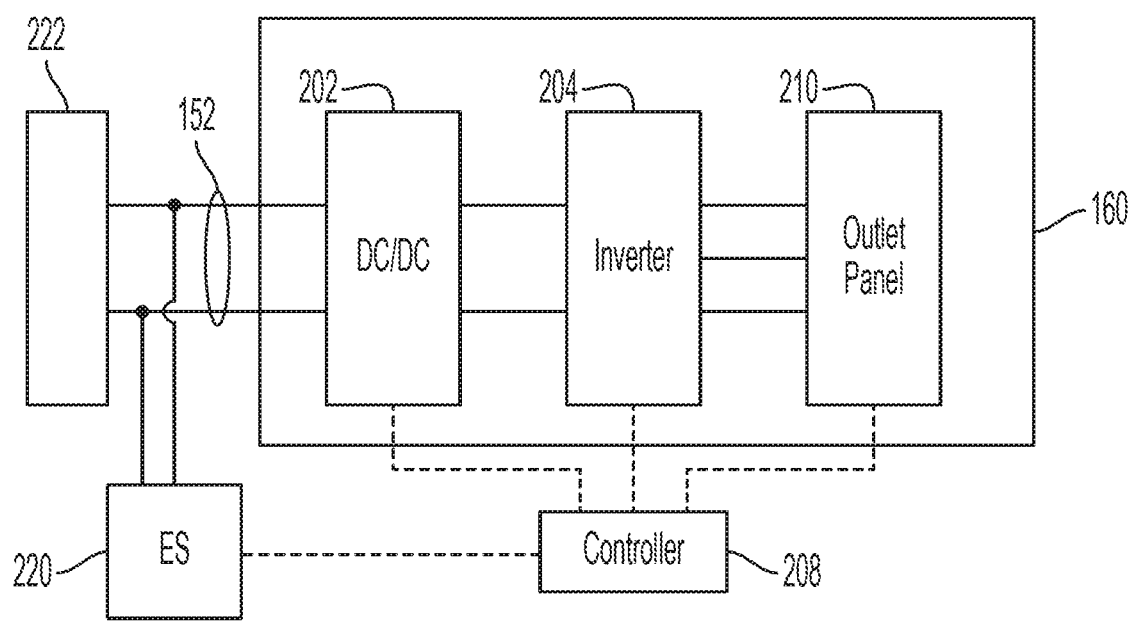
FIG. 2 is a block diagram illustrating operation of a system or method for on-board generator operation with power limit arbitration.

FIG. 2 illustrates a block diagram of a representative on-board generator system having arbitrated power limits according to various embodiments of the present disclosure. The OBGI system 160 may include a DC/DC power converter 202 that provides power to an inverter 204. In some configurations, the function of the DC/DC power converter 202 may be provided by the DC/DC converter module 128 that powers the low-voltage bus 154. The inverter 204 may be configured to convert a DC voltage input to an alternating current (AC) voltage output. The DC/DC power converter 202 may be configured to adjust the voltage level of the traction battery 124 to a voltage level used by the inverter 204. The inverter 204 may be configured to provide one or more voltage outputs. For example, the inverter 204 may be configured to provide three voltage outputs. In some configurations, the OBGI system 160 may be configured to utilize existing DC/DC converters and inverters that are in the vehicle (e.g., DC/DC converter module 128 and Power Electronics Module 126). The vehicle may include a controller 208 that is configured to operate the components of the OBGI system 160 including the DC/DC converter 202 and the inverter 204. In some configurations, the controller 208 may be part of the OBGI system 160.

Power sources 222 may supply power to the high-voltage bus 152. The power sources 222 may include the traction battery 124 and the electric machines 114 operating as generators driven by the engine 118. The power sources 222 may include any component configured to provide power to the high-voltage bus 152. The vehicle may further include various electrical systems 220. The electrical systems 220 may include electrical components that draw power from the high-voltage bus 152 (e.g., electric machines 114, DC-DC converter module 128, electrical loads 146, brake system 150). While the OBGI system 260 draws power from the high-voltage bus 152, it may be considered as a separate electrical system. The controller 208 may be configured to operate the electrical systems 220 and/or affect operation of the electrical systems 220 to control power supplied to inverter 204. The controller 208 may interact directly and/or indirectly with the electrical systems 220 to control an amount of power used. For example, the controller 208 may be in communication with the electrical systems 220 to set an amount of power that is available for the electrical systems 220 and perform load shedding by temporarily disabling one or more integrated components of the vehicle within ES 220, such as an A/C compressor, electric heater, etc. so that more power is available for delivery to inverter 204 and outlet panel 210. The controller 208 may operate in coordination with other controllers distributed in the vehicle to operate the electrical systems 220. Operating the electrical systems 220 may include controlling or limiting an amount of power used by the electrical systems 220. This may include limiting power draw for one or more of the electrical systems 220 to an amount that is less than a demanded power usage.

The DC/DC power converter 202 may include inputs that are electrically coupled to the high-voltage bus 152 and the traction battery 124. The DC/DC power converter 202 may be configured to convert the voltage level of the high-voltage bus 152 to a desired voltage input level for the inverter 204. The DC/DC power converter 202 may include a bypass mode in which the voltage of the high-voltage bus is transferred to the inputs of the inverter 204. The DC/DC power converter 202 may include switching devices and circuit elements that are arranged and controlled to output the desired voltage level. The switching devices may be controlled by a controller (e.g., controller 208) that sequences the switching according to the desired power output. The DC/DC power converter 202 may include boost modes of operation that output a voltage that is greater than the voltage of the high-voltage bus 152. The DC/DC power converter 202 may include buck modes of operation that output a voltage that is less than the voltage of the high-voltage bus 152.

The inverter 204 may be configured to provide one or more voltage/current outputs. The inverter 204 may be configured to convert a DC voltage input into one or more AC voltage outputs having associated voltages that may be the same or different nominal voltages. The inverter 204 may be a multi-phase inverter that is configured to provide multiple AC voltage/current waveforms. The inverter 204 may include power switching circuitry that includes a plurality of switching devices. The switching devices may be Insulated Gate Bipolar Junction Transistors (IGBTs) or other solid-state switching devices. The switching devices may be arranged to selectively couple a positive terminal and a negative terminal of the high-voltage bus 152 to each terminal or leg of the inverter power output. Each of the switching devices within the power switching circuitry may have an associated diode connected in parallel to provide a path for inductive current when the switching device is in a non-conducting state. Each of the switching devices may have a control terminal for controlling operation of the associated switching device. The control terminals may be electrically coupled to a controller. The controller may include associated circuitry to drive and monitor the control terminals. For example, the control terminals may be coupled to the gate input of the solid-state switching devices.

Each leg of the inverter 204 may include a first switching device that selectively couples the HV-bus positive terminal to the associated output terminal. A first diode may be coupled in parallel to the first switching device. A second switching device may selectively couple the HV-bus negative terminal to the associated output terminal. A second diode may be coupled in parallel to the second switching device. Each inverter output leg may be similarly configured. Each leg of the inverter 204 may be configured to control the voltage between the associated output terminal and a neutral terminal to a desired voltage magnitude and frequency.

The controller (e.g., 208) may be programmed to operate the switching devices to control the voltage and current at the phase outputs. The controller 208 may operate the switching devices so that each inverter output is coupled to only one of the HV-bus positive terminal or the HV-bus negative terminal at a particular time. Various power output algorithms and strategies are available to be implemented in the controller 208. The inverter outputs may be characterized by voltage magnitude, current magnitude, and frequency. The controller 208 may be programmed to operate the inverter 204 to achieve the desired voltage and current output waveform, i.e. a sine wave output of 50 Hz or 60 Hz having a nominal voltage of 110 VAC, 120 VAC, 208 VAC, and/or 220 VAC, for example. The controller 208 may implement open-loop and/or closed loop strategies to achieve the result. The controller 208 may operate the switching devices with a pulse-width modulated (PWM) gate signal.

The inverter 204 may include current sensors for each inverter power output. The current sensors may be inductive or Hall-effect devices configured to generate a signal indicative of the current passing through the associated circuit. The controller 208 may sample the current sensors at a predetermined sampling rate.

The inverter 204 may include one or more voltage sensors. The voltage sensors may be configured to measure an input voltage to the inverter 204 and/or one or more of the output voltages of the inverter 204. The voltage sensors may be resistive networks and include isolation elements to separate high-voltage levels from the low-voltage system. In addition, the inverter 204 may include associated circuitry for scaling and filtering the signals from the current sensors and the voltage sensors.

In some configurations, the DC/DC power converter 202 and inverter 204 may be integrated as a single unit. The overall function may remain as described. The result is that the OBGI system 160 is configured to provide one or more power outputs for external devices. The controller 208 may be configured to operate the DC/DC power converter 202 and the inverter 204 to achieve the desired inverter power outputs.

The OBGI system 160 may include an outlet panel 210. Industrial and household systems generally use commonly available power connections. For example, household applications typically utilize 120 VAC electrical power. Other household applications may use 240 VAC electrical power. The outlet panel 210 may be designed to support both types of power connections. The outlet panel 210 may be electrically coupled to the inverter 204 and may be configured to receive power from the inverter 204. Various plugs may be commonly locating in a single outlet panel inside or outside of the vehicle and/or distributed around the interior/exterior of the vehicle depending on the particular application and implementation.

Figure 3:
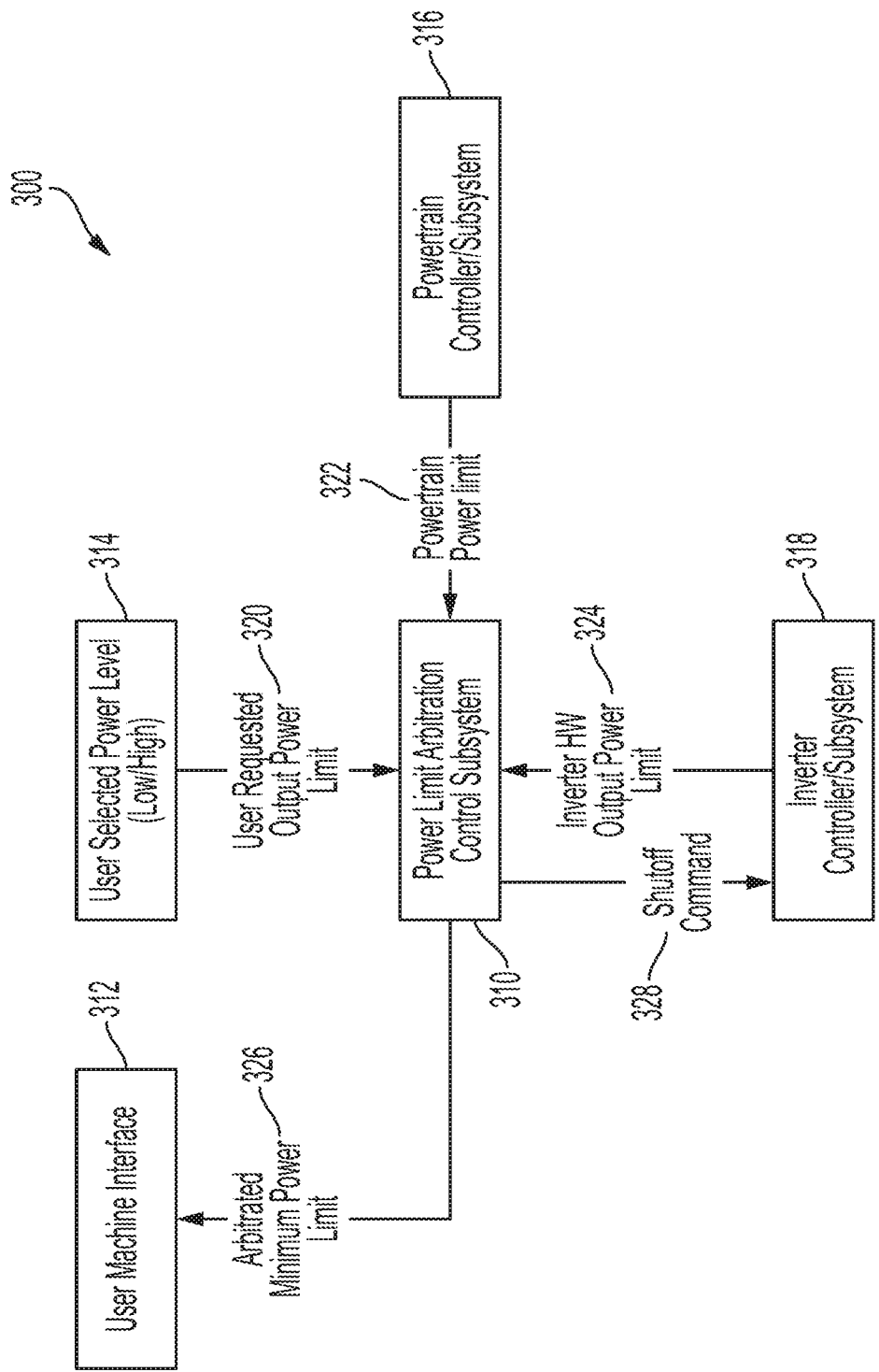
FIG. 3 illustrates a power limit arbitration system or strategy for an on-board generator.

FIG. 3 is a block diagram illustrating operation of a system or strategy 300 for power limit arbitration of an on-board generator in an electrified vehicle according to various embodiments of the disclosure. Power limit arbitration control subsystem 310 may select or determine a power limit for the on-board generator inverter (OBGI) from a plurality of power limits association with various vehicle controllers or subsystems. Power limits may be based on current vehicle and/or ambient operating conditions and may be determined by a particular controller associated with a vehicle subsystem, or may be determined by power limit arbitration control subsystem 310 based on sensor or other inputs associated with the respective vehicle subsystem. Some system parameters or operating conditions may affect more than one vehicle subsystem, such as coolant temperature or ambient temperature, for example.

User-machine interface 312 may receive user input to select one of a plurality of predetermined power limits to provide a user-selected power limit 320 based on the user-selected power level as indicated at 314. In one embodiment, the user-selected power level corresponds to one of a low/high level having associated power limits of 400 W and 7,200 W, respectively. In other embodiments, a user selected power level may include enabling/disabling of one or more power outlets or voltage levels, or groups of outlets (interior vs. exterior, for example). Of, course various other settings may be provided depending on the particular application and implementation. The user-machine interface 312 may also display the currently active arbitrated minimum power limit 326 as determined by the power limit arbitration control subsystem 310 and/or the currently selected user power level.

Power limit arbitration control subsystem 310 receives the corresponding user requested output power limit 320 and arbitrates among various other power limits, such as a powertrain power limit 322 received from a powertrain controller/subsystem 316, and an inverter hardware output power limit 324 associated with the inverter controller/subsystem 318 of the OBGI. As used herein, an arbitration strategy may determine a power limit by selecting one of multiple power limits associated with various subsystems, by applying an equation or formula to combine or otherwise adjust power limits from two or more subsystems, or to control or command one or more vehicle subsystems to reduce power output demand or increase power input by one or more integrated vehicle components to determine an arbitrated power limit. Similarly, a single or multi-dimensional lookup table may be stored in an associated memory and accessed or indexed by one or more subsystem power limits. Similarly, power limits may be adjusted or scaled based on one or more vehicle or ambient operating conditions, such as vehicle speed, component temperature, ambient temperature, coolant temperature, etc. In one embodiment, power limit arbitration control subsystem 310 selects a lowest one of the user-selected/specified power limit 320, the powertrain power limit 322, and the inverter hardware power limit 324. Power limit arbitration control subsystem 310 may limit power provided by the OBGI to the arbitrated minimum power limit 326 via an associated shutoff command 328 that may terminate power to one or more power outlets supplied by the inverter controller/subsystem 318.

Powertrain controller/subsystem 316 may determine a powertrain power limit 322 based on the driver demand and current power capability of one or more energy sources, such as engine 118, electric machine 114, and traction battery 124, for example. Sources may be controlled to provide additional power and increase the associated powertrain power limit 322. For example, engine 118 may be started to operate electric machine 114 as a generator to increase the powertrain power limit 322 if the powertrain power limit is currently limiting power provided by OBGI 160. Similarly, electric machine 114 may influence the powertrain power limit 322 by powering OBGI 160 rather than storing energy in traction battery 124. Likewise, powertrain controller/subsystem 316 may increase vehicle cooling capability via operation of active shutters or control of an associated coolant pump to increase cooling to increase the powertrain power limit 322 so that more power may be provided to external devices 166 to meet a load demand or user selected power limit as arbitrated by power limit arbitration system 310. The powertrain power limit 322 may also vary based on various other vehicle and ambient operating conditions, such as coolant temperature, ambient temperature, vehicle speed and/or operating mode (on-road vs. stationary, electric only vs. hybrid, cruise control, etc.), state of charge (SOC) of traction battery 124, current engine output power, maximum engine output power, current electric machine output power, maximum engine output power, and the like.

Figure 4:
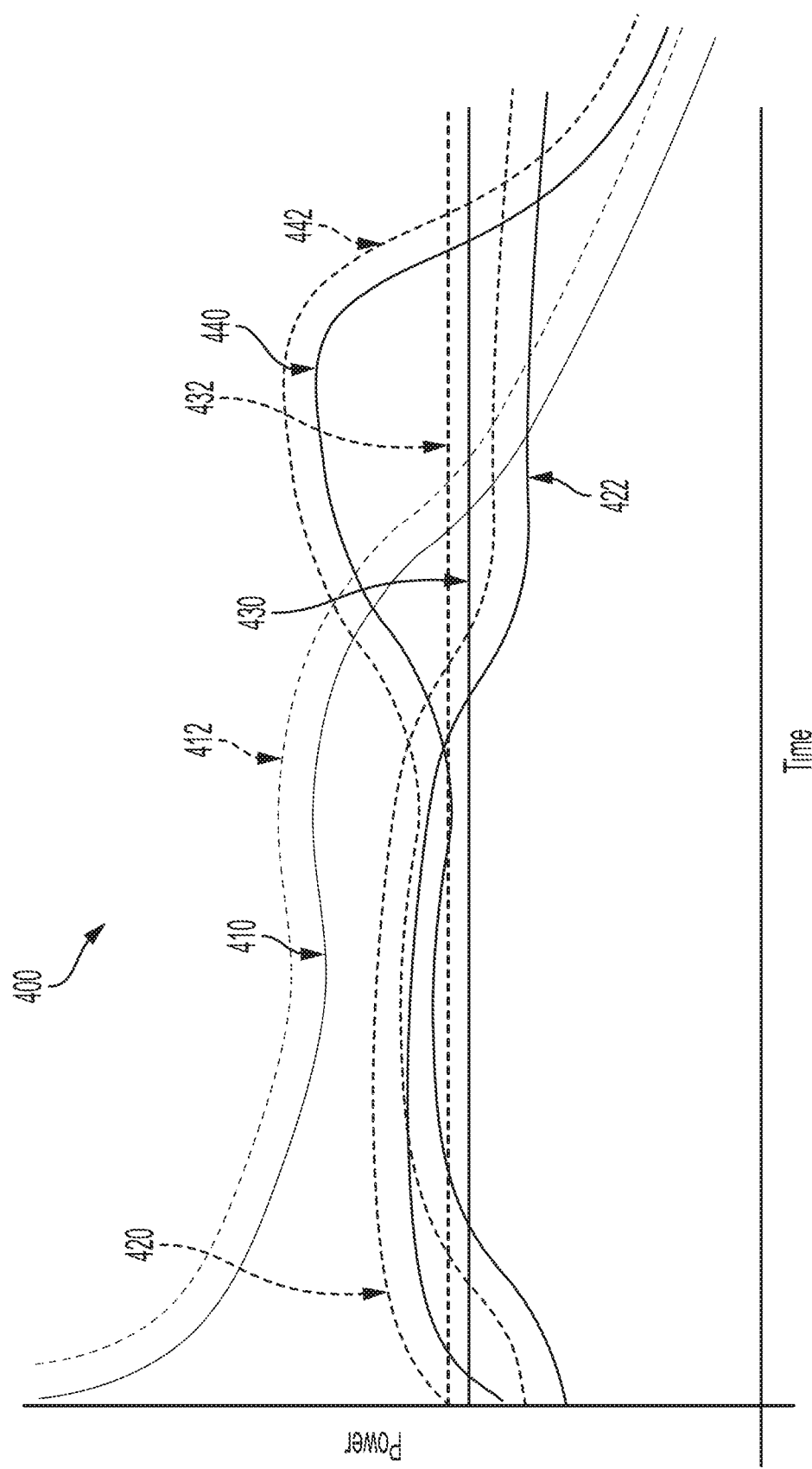
FIG. 4 illustrates representative power limits as a function of time for use in a power limit arbitration system or strategy.

FIG. 4 is a graph illustrating representative power limits 400 associated with various vehicle subsystems. As generally illustrated, power limits 400 may vary over time in relation to other power limits as well as vehicle and/or ambient operating conditions. A power limit arbitration system or strategy according to the disclosure may apply a rule, operation, statistical function, algorithm, etc. to determine a current power limit to control the on-board generator inverter. In the illustrated embodiments, the power limits include an inverter hardware output power limit 410 reflecting inverter losses and an associated inverter hardware input limit 412. A powertrain limit 420 and associated powertrain limit adjusted for inverter losses 422. A user-selected or specified limit is represented at 432 with the associated limit adjusted for inverter losses as represented at 430. An on-board generator power demand to satisfy a current power load of the on-board generator is represented at 442 with associated inverter losses reflected as indicated at 440. In one embodiment, the arbitration subsystem selects the lowest or minimum of the powertrain power limit 420/422, the inverter hardware power limit 410/412, and the user-specified power limit 430/432 and controls the inverter to limit the output power to the arbitrated limit. As shown in the representative example illustrated in FIG. 4, the arbitration strategy would deliver power corresponding to the area under the lowest curve.

Figure 5:
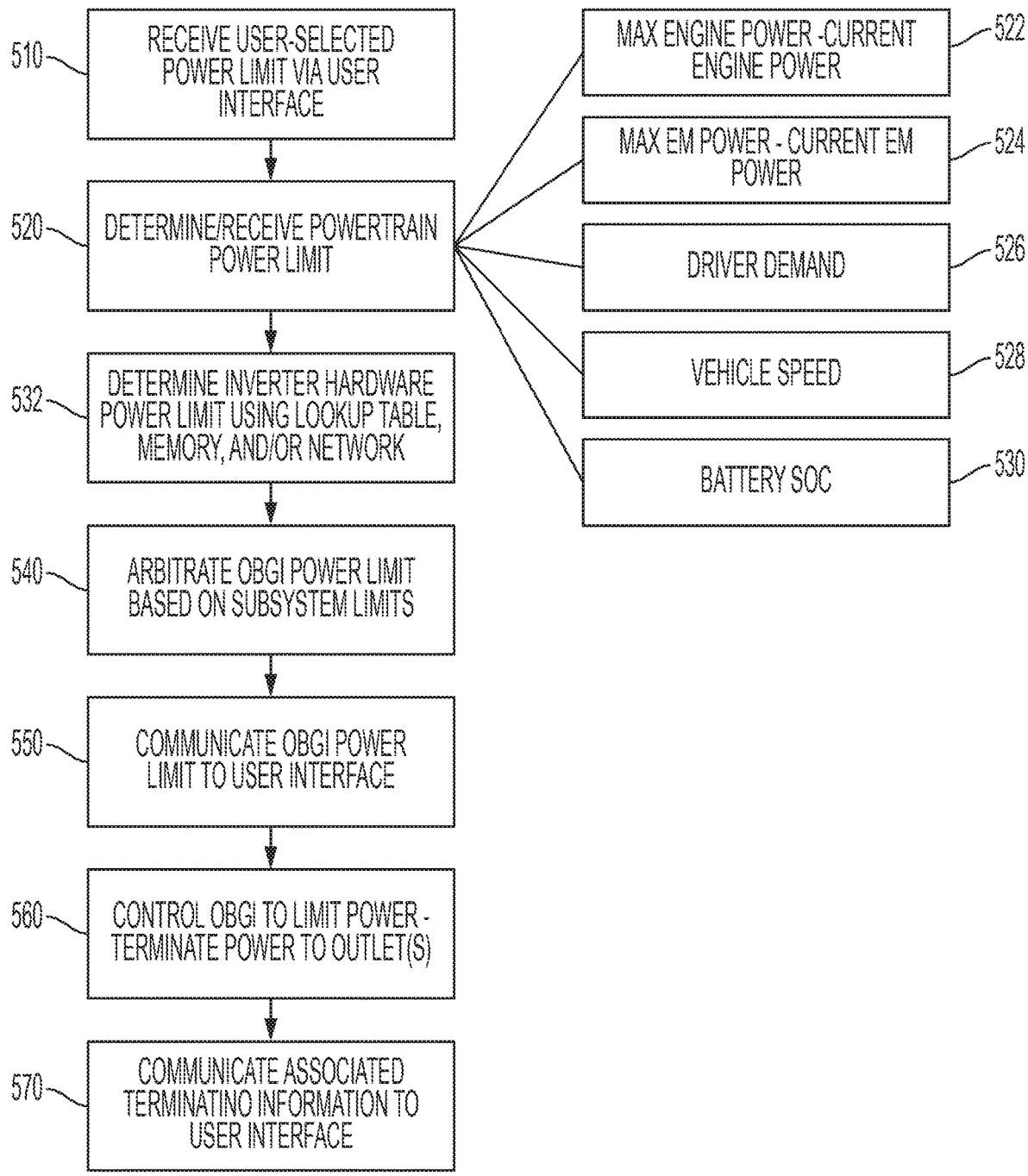
FIG. 5 is a flowchart illustrating operation of a representative system or method for controlling an on-board generator of an electrified vehicle based on a power limit arbitration strategy.

FIG. 5 is a flowchart illustrating operation of a system or method for power limit arbitration of an integrated on-board generator in an electrified vehicle according to various embodiments of the disclosure. Block 510 represents receiving a user-selected power limit via a user interface. A powertrain power limit is determined or received as represented at 520. The powertrain power limit may be based on a difference between current engine output power and maximum engine output power 522, a difference between current electric machine output power and maximum electric machine output power 524, and driver demand 526. The powertrain power limit may be further based on vehicle speed 528 and state-of-charge of the high-voltage traction battery 530.

An inverter hardware power limit is determined or received as indicated at 532. The inverter hardware power limit may vary based on temperature of the hardware, ambient temperature, coolant temperature, or various other vehicle or ambient operating parameters. The associated inverter hardware power limit may be stored in a persistent memory in a lookup table or as a value adjusted based on one or more current operating/ambient parameters. An arbitrated OBGI power limit is determined or selected as indicated at 540. In one embodiment, the arbitrated OBGI power limit is the lowest one of a plurality of power limits including at least a user-selected power limit, a powertrain power limit associated with the electric machine power output, and an inverter hardware power limit. The arbitrated power limit is then communicated to a user interface as indicated at 550. The system and method may optionally include controlling the OBGI by terminating power to at least one of a plurality of power outlets to control the OBGI to limit power to the lowest one of the plurality of power limits as indicated at 560, and communicating associated information to the user interface as represented at 570.

As such, one or more embodiments according to the present disclosure may include associated advantages, such as providing an electrified vehicle with an on-board generator capable of providing 120/240 VAC with high power output capacity between 2.0-7.2 kW, for example. Sine wave AC power generation is integrated with the vehicle using existing vehicle powertrain and cooling systems. Power generation capability is provided while the vehicle is on-road or stationary to various outlets throughout the vehicle to provide power for customer-provided or external devices. Power may be sourced from a high-voltage traction battery in battery electric vehicles (BEVs) as well as from the electric machine driven by the engine in hybrid vehicles. To facilitate high capacity power delivery, one or more controllers provide a system and method for arbitration and aggregation of power limits from multiple vehicle subsystems as well as a user selected power limit provided via a user interface. The user interface provides feedback to the user with respect to active power limits and sources as well as any load shedding or power reduction to one or more outlets or subsystems.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as RAM devices, flash devices and/or other solid state storage devices. The processes, methods, or algorithms can also be implemented in a software executable object or code. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, firmware, and software components.

While representative embodiments are described above, it is not intended that these embodiments describe all possible forms encompassed by the claims. The words used in the specification are words of description rather than limitation, and it is understood that various changes can be made without departing from the disclosure. As previously described, the features of various embodiments can be combined to form further embodiments of the claimed subject matter that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications or implementations.

What is claimed is:

1. An electrified vehicle comprising:
    an electric machine coupled to a high-voltage traction battery configured to selectively propel the electrified vehicle;
    an inverter electrically coupled to the high-voltage traction battery and configured to convert direct current input to alternating current output;
    power outlets configured to receive power from the inverter; and
    a controller programmed to limit power provided by the inverter to the power outlets to a lowest one of a user-specified power limit, a powertrain power limit associated with the electric machine and the high-voltage traction battery, and an inverter hardware power limit.

2. The electrified vehicle of claim 1 further comprising an engine coupled to the electric machine, wherein the powertrain power limit is further associated with the engine.

3. The electrified vehicle of claim 2 wherein the controller is further programmed to limit the power provided by the inverter based on the powertrain power limit, which is responsive to current engine output power, current vehicle speed, current driver demand, and current electric machine output power.

4. The electrified vehicle of claim 1 further comprising a user interface configured to receive input from a user to select the user-specified power limit from a plurality of available user-specified power limits.

5. The electrified vehicle of claim 1 further comprising a user interface, wherein the controller is further programmed to communicate a currently active power limit to the user interface.

6. The electrified vehicle of claim 5 wherein the user interface is configured to receive a user-specified power limit.

7. The electrified vehicle of claim 1 wherein the powertrain power limit and the inverter hardware power limit include associated estimated losses of the powertrain and inverter hardware, respectively.

8. A method for controlling an electrified vehicle having an electric machine coupled to a high-voltage traction battery configured to selectively propel the vehicle and an inverter electrically coupled to the high-voltage traction battery and configured to convert direct current input to alternating current output connected to a plurality of vehicle outlets, the method comprising, by a controller:
   controlling the inverter to limit power to the plurality of vehicle outlets to a lowest one of a plurality of power limits including at least a user-selected power limit, a powertrain power limit associated with electric machine power output, and an inverter hardware power limit; and
   communicating the lowest one of the power limits to a user interface.

9. The method of claim 8 further comprising receiving the user-selected power limit via the user interface.

10. The method of claim 8 wherein the vehicle includes an engine selectively coupled to the electric machine, wherein the powertrain power limit is based on current engine output power, maximum engine output power, current electric machine output power, maximum electric machine output power, and driver demand.

11. The method of claim 10 wherein the powertrain power limit is further based on vehicle speed.

12. The method of claim 11 wherein the powertrain limit is further based on a state-of-charge of the high-voltage traction battery.

13. The method of claim 12 further comprising terminating power to at least one of the plurality of power outlets to control the inverter to limit power to the lowest one of the plurality of power limits.

14. The method of claim 13 further comprising communicating the terminating of power to the user interface.

15. An electrified vehicle, comprising:
   an engine;
   an electric machine selectively coupled to the engine;
   a high-voltage traction battery electrically coupled to the electric machine and configured to selectively propel the electrified vehicle;
   an on-board generator including an inverter electrically coupled to the high-voltage traction battery and configured to convert direct current input to alternating current output;
   power outlets configured to receive power from the inverter of the on-board generator;
   a user interface; and
   a controller programmed to control the engine, the electric machine, and the high-voltage traction battery to provide power to on-board generator and to control the inverter to limit the power output by the inverter to the power outlets to a lowest one of: a user-specified power limit based on input from the user interface; a powertrain power limit associated with the engine, the electric machine, and the high-voltage traction battery; and an inverter hardware power limit.

16. The electrified vehicle of claim 15 wherein the controller is further programmed to communicate which power limit is currently limiting the power output by the inverter to the user interface.

17. The electrified vehicle of claim 16 wherein the controller is further programmed to terminate power to at least one of the power outlets to limit the power output by the inverter.

18. The electrified vehicle of claim 17 wherein the powertrain power limit is based on current engine output power, current electric machine output power, state of charge of the high-voltage traction battery, and vehicle speed.

* * * * *